(12) United States Patent
Xu et al.

(10) Patent No.: US 11,063,321 B2
(45) Date of Patent: Jul. 13, 2021

(54) SAMPLING COMPONENT AND BATTERY MODULE

(71) Applicant: Contemporary Amperex Technology Co., Limited, Ningde (CN)

(72) Inventors: Bohao Xu, Ningde (CN); Hua Cao, Ningde (CN); Mu Qian, Ningde (CN); Jihua Yao, Ningde (CN); Lin Zheng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 44 days.

(21) Appl. No.: 16/391,661

(22) Filed: Apr. 23, 2019

(65) Prior Publication Data

US 2020/0028143 A1 Jan. 23, 2020

(30) Foreign Application Priority Data

Jul. 23, 2018 (CN) .......................... 201810813707.2

(51) Int. Cl.
*H01M 50/503* (2021.01)
*H01M 50/502* (2021.01)
*H01M 10/42* (2006.01)
*H01M 10/48* (2006.01)
*H01M 50/20* (2021.01)

(52) U.S. Cl.
CPC ....... *H01M 50/502* (2021.01); *H01M 10/425* (2013.01); *H01M 10/482* (2013.01); *H01M 50/20* (2021.01)

(58) Field of Classification Search
CPC .. H01M 2/206; H01M 2/1077; H01M 10/425; H01M 10/482
See application file for complete search history.

(56) References Cited

U.S. PATENT DOCUMENTS

2012/0015550 A1* 1/2012 Ikeda ................. H01M 50/502 439/391
2012/0328908 A1* 12/2012 Han ..................... H01M 2/1061 429/7
2018/0138485 A1 5/2018 Nakayama et al.

FOREIGN PATENT DOCUMENTS

| CN | 102544616 B | 7/2014 |
| CN | 203839479 U | 9/2014 |

(Continued)

OTHER PUBLICATIONS

The extended European search report for European Application No. 19158213.9, dated Oct. 2, 2019, 7 pages.

(Continued)

*Primary Examiner* — James Lee
(74) *Attorney, Agent, or Firm* — Law Offices of Liaoteng Wang

(57) ABSTRACT

Embodiments of the present invention provide a sampling component and a battery module. The sampling component is applied to a battery module and comprises: a busbar having a first surface and a second surface which are opposite to each other, the busbar comprising mounting slots formed by extending in a direction from the first surface to the second surface; a circuit board disposed on a side of the busbar; and, a connecting sheet, comprising a first flat portion and a bent portion which are connected to each other, one end of the first flat portion being connected to the busbar while the other end thereof being connected to the circuit board, the bent portion being located in the mounting slots.

11 Claims, 8 Drawing Sheets

(56) References Cited

FOREIGN PATENT DOCUMENTS

| | | |
|---|---|---|
| CN | 206180029 U | 5/2017 |
| CN | 107683540 A | 2/2018 |
| CN | 108258168 A | 7/2018 |
| WO | 2015099062 A1 | 7/2015 |
| WO | WO2017213384 A1 | 12/2017 |
| WO | 2018/116822 A1 | 6/2018 |

OTHER PUBLICATIONS

The first Office Action for Chinese Application No. 201810813707.2, dated Aug. 31, 2020, 15 pages.
The Communication about Intention to grant a European patent for European Application No. 19158213.9, dated Feb. 2, 2021, 5 pages.

\* cited by examiner

SAMPLING COMPONENT AND BATTERY MODULE

CROSS-REFERENCE TO RELATED APPLICATION

This application claims priority to Chinese Patent Application No. 201810813707.2, filed on Jul. 23, 2018, which is hereby incorporated by reference in its entirety.

TECHNICAL FIELD

The present invention relates to the technical field of batteries, and in particular to a sampling component and a battery module.

BACKGROUND

Nowadays, with the increasing development of battery technology, the reliability of the structure in a battery pack and a battery module is a guarantee for the safe operation of a battery system. To ensure the safe operation of the battery system, the battery module will sample the voltage, temperature and other information of battery cell. At present, sampling methods for the battery module include the following methods: sampling by a harness, sampling by bonding, sampling by a connecting sheet and the like, wherein the sampling by a connecting sheet is applied relatively widely. When a structure is sampled by a connecting sheet, the connection strength between the connecting sheet and a busbar needs to be ensured. Hence, in the prior art, the busbar and the connecting sheet are generally fixed by increasing the welding strength of the connecting sheet and the busbar or by welding other components. By the two processing methods, the process complexity is increased, the production efficiency is reduced, and the cost is also increased.

Therefore, there is an urgent need for a novel sampling component and a battery module.

SUMMARY

Embodiments of the present invention provide a battery module in order to enhance the connection strength between a connecting sheet and a busbar.

One aspect of the embodiments of the present invention provides a sampling component, applied to a battery module, including: a busbar having a first surface and a second surface which are opposite to each other, the busbar including mounting slots formed by extending in a direction from the first surface to the second surface; a circuit board disposed on a side of the busbar; and, a connecting sheet, including a first flat portion and a bent portion which are connected to each other, one end of the first flat portion being connected to the busbar while the other end of the first flat portion being connected to the circuit board, the bent portion being located in the mounting slots.

According to one aspect of the present invention, the mounting slots are straight slots that run through the first surface and the second surface.

According to one aspect of the present invention, a notch running through the first surface and the second surface is formed on a side edge of the busbar, and the bent portion can be inserted into the mounting slots through the notch.

According to one aspect of the present invention, the connecting sheet further includes second flat portions, which are connected to the first flat portion through the bent portion and fitted with the first surface and/or the second surface.

According to one aspect of the present invention, there are more than two mounting slots, the mounting slots have a preset length in a first direction, and the more than two mounting slots are arranged at intervals in a second direction; and the bent portion includes more than two bent sub-portions which are located in the more than two mounting slots, respectively, and the first flat portion and the second flat portions are connected to each other by the bent sub-portions.

According to one aspect of the present invention, the second flat portions are formed by extending in a direction close to or away from the first flat portion.

According to one aspect of the present invention, there are two second flat portions;

the bent sub-portions include a first bent sub-portion and a second sub-portion, the first flat portion is connected to one of the second flat portions through the first bent sub-portion, and the two second flat portions are connected through the second bent sub-portion.

According to one aspect of the present invention, one of the second flat portions is formed by extending the first bent sub-portion in a direction close to the first flat portion, while the other one of the second flat portions is formed by extending the second bent sub-portion in a direction away from the first flat portion;

or, one of the second flat portions is formed by extending the first bent sub-portion in a direction away from the first flat portion, while the other one of the second flat portions is formed by extending the second bent sub-portion in a direction away from the first flat portion.

According to one aspect of the present invention, the bent sub-portions further include a third bent sub-portion which is connected to one end, away from the first flat portion, of the other one of the second flat portions.

According to one aspect of the present invention, the sampling component further includes a harness isolation plate disposed on a side of the busbar away from the first flat portion, an evasion hole arranged opposite to the first flat portion in a third direction being formed on the harness isolation plate.

A second embodiment of the present invention provides a battery module, including: a plurality of batteries arranged side by side in a first direction; and, a sampling component connected to the plurality of batteries, the sampling component being the sampling component described above.

In the embodiments of the present invention, mounting slots are formed on the busbar, and the bent portion of the connecting sheet can be stretched into the mounting slots. Since the bent portion is located in the mounting slots, the connecting sheet can be joined at the busbar by the mounting slots without influencing the connection of the connecting sheet to the circuit board by the first flat portion. The connecting sheet is limited by the mounting slots. Accordingly, the connection between the connecting sheet and the busbar becomes more stable, and the connection strength between the connecting sheet and the busbar is improved. Furthermore, the bent portion located in the mounting slots can increase the contact area between the connecting sheet and the busbar and improve the overload quantity.

BRIEF DESCRIPTION OF THE DRAWINGS

Other features, objectives and advantages of the present invention will become apparent when reading the following

Figure 1:
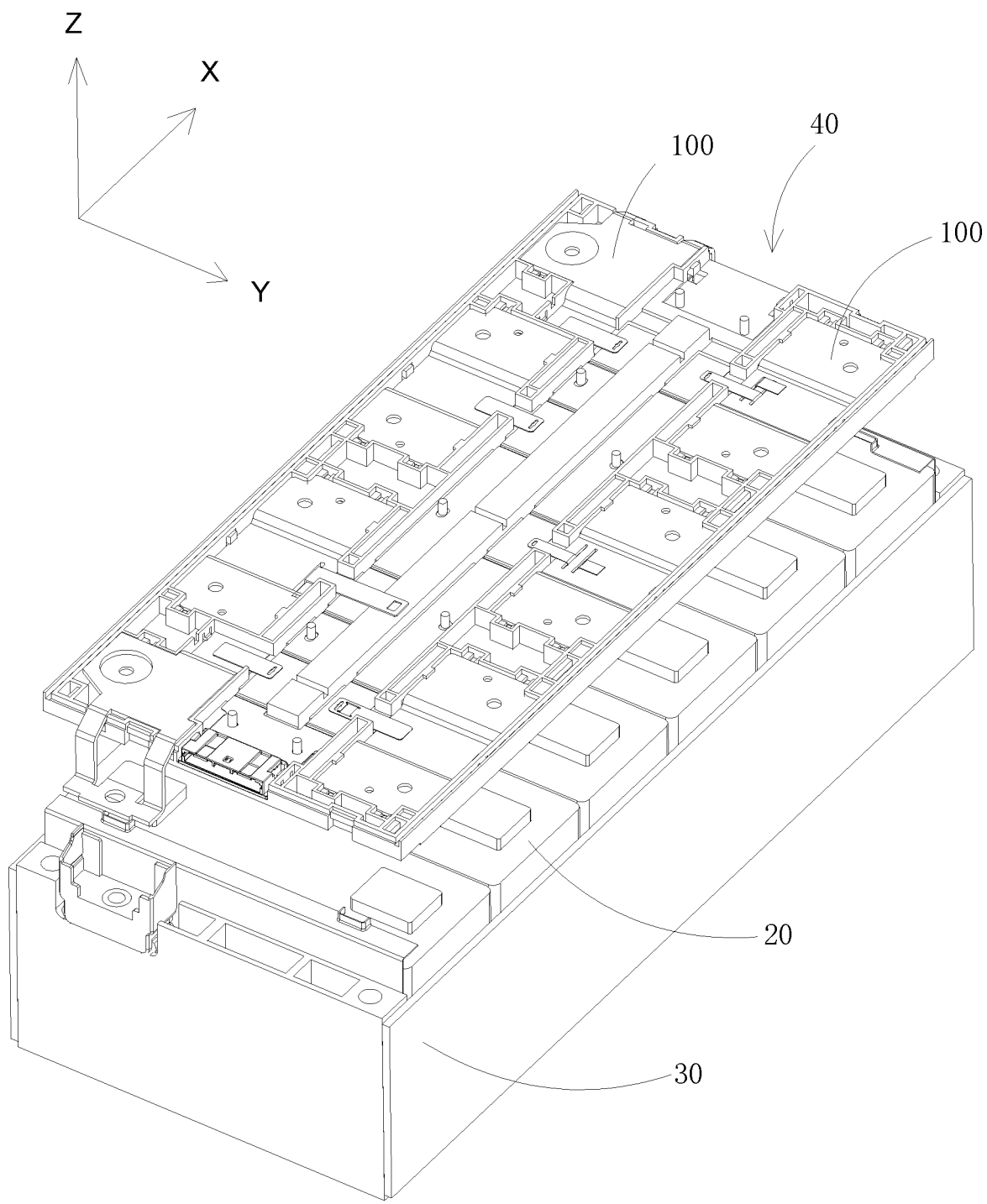
FIG. 1 is a schematic structure diagram of a battery module according to an embodiment of the present invention.

in which:

10: sampling component; 100: busbar; 110: side edge; 120: surface; 121: first surface; 122: second surface; 130: notch; 140: mounting slot; 200: connecting sheet; 210: first flat portion; 211: second flat portion; 220: bent portion; 221: bent sub-portion; 221a: first bent sub-portion; 221b: second bent sub-portion; 221c: third bent sub-portion; 300: harness isolation plate; 310: evasion hole; 310: evasion hole; 400: circuit board; 20: battery cell; 30: battery box body; 40: connecting component; X: first direction; Y: second direction; and, Z: third direction.

DETAILED DESCRIPTION

The features and exemplary embodiments of various aspects of the present invention will be described below in detail. Many specific details are provided in the following detailed description in order to provide the comprehensive understanding of the present invention. However, it is apparent for those skilled in the art that the present invention can be implemented without some of these specific details. The following description of the embodiments is merely for providing better understanding of the present invention by illustrating examples of the present invention. In the drawings and the following description, at least some of the known structures and technologies are not shown in order to avoid unnecessarily obscuring the present invention. Moreover, for clarity, some structures may be oversized. In addition, the features, structures of characteristics described hereinafter may be integrated in one or more embodiments in any suitable way.

The words of locality present in the following description indicate directions shown in the drawings, rather than limiting the specific structures of the embodiments of the present invention. It is also to be noted that, in the description of the present invention, unless otherwise explicitly specified and defined, the terms "mounting" and "connection" shall be interpreted expansively. For example, the "connection" may be fixed connection, or may be detachable connection or integral connection; or, may be direct connection or indirect connection. The specific meanings of the terms in the present invention may be interpreted by a person of ordinary skill in the art according to the specific situation.

In order to better understand the present invention, the sampling module and the battery module according to the embodiments of the present invention will be described below in detail with reference to FIGS. 1-11.

Figure 2:
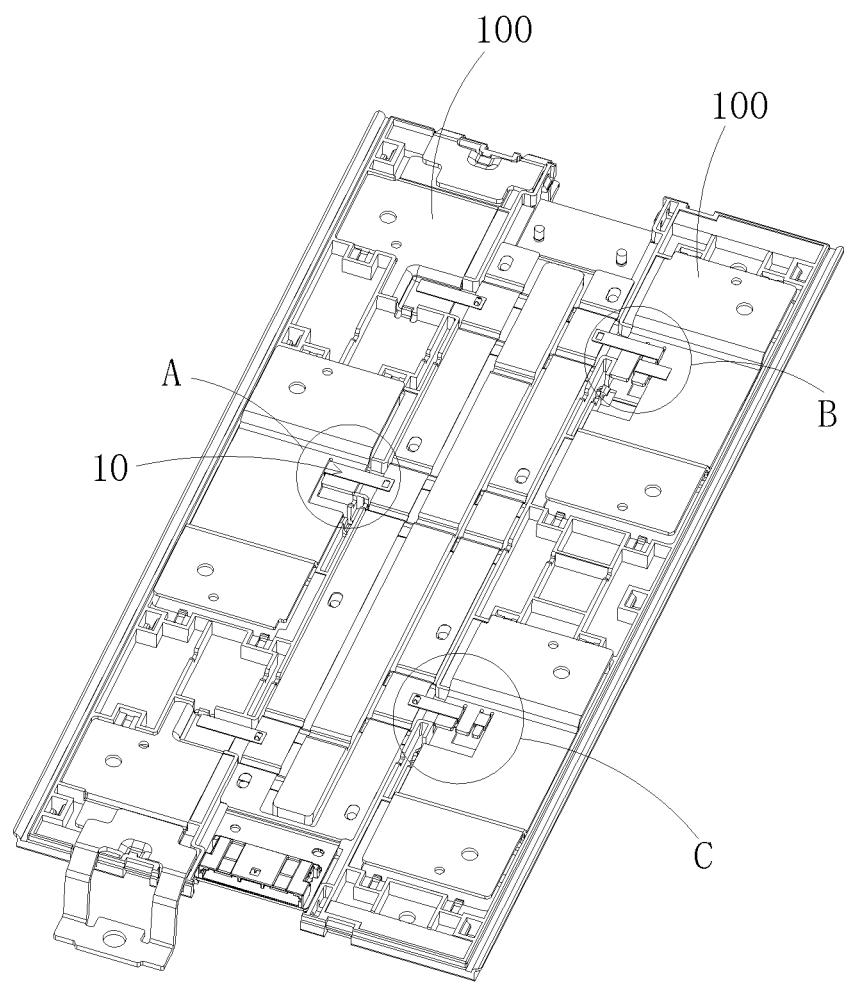
FIG. 2 is a schematic structure diagram of a connecting component for the battery module according to an embodiment of the present invention.

Referring to FIGS. 1 and 2, FIG. 1 is a schematic structure diagram of a battery module according to an embodiment of the present invention, and FIG. 2 is a schematic structure diagram of a connecting component for the battery module. The battery module includes: a plurality of battery cells 20, which are arranged side by side in a first direction (an X direction in FIG. 1); a battery box 30, which is sheathed outside the plurality of battery cells 20; and, a connecting component 40 located above the plurality of battery cells 20 in a Z direction, wherein the connecting component 40 includes a sampling component 10 which is connected to the plurality of battery cells 20 and located on the top of the plurality of battery cells 20 in a third direction (a Z direction in FIG. 1).

Referring to FIGS. 2-11, the sampling component 10 is arranged in various ways. In some optional implementations, the sampling component 10 includes: a busbar 100, surfaces of the busbar 100 including a first surface 121 and a second surface 122 which are opposite to each other, the busbar 100 further including mounting slots 140 formed by extending in a direction from the first surface 121 to the second surface 122; a circuit board 400 disposed on a side of the busbar 100; and, a connecting sheet 200, including a first flat portion 210 and a bent portion 220 which are connected to each other, one end of the first flat portion 210 being connected to the busbar 220 while the other end thereof being connected to the circuit board 400, the bent portion 220 being located in the mounting slots 140.

There are many ways to connect the first flat portion 210 to the busbar 100. In the embodiments of the present invention, in order to increase the contact area between the first flat portion 210 and the busbar 100 and also increase the overhead quantity, the first flat portion 210 is fitted with the first surface 121 of the busbar 100.

In the embodiments of the present invention, mounting slots 140 are formed on the busbar 100, and the bent portion 220 of the connecting sheet 200 can be stretched into the mounting slots 140. Since the bent portion 220 is located in the mounting slots 140, the connecting sheet 200 can be joined at the busbar 100 by the mounting slots 140 without influencing the connection of the connecting sheet 200 to the circuit board 400 by the first flat portion 210. The connecting sheet 200 is limited by the mounting slots 140. Accordingly, the connection between the connecting sheet 200 and the busbar 100 becomes more stable, and the connection strength between the connecting sheet 200 and the busbar 100 is improved. Furthermore, the bent portion 220 located in the mounting slots 140 can increase the contact area between the connecting sheet 200 and the busbar 100 and improve the overload quantity.

It should be understood that the mounting slots 140 are arranged in various ways. For example, the mounting slots 140 may be blind slots or straight slots. In this embodiment, in order to make the connection between the connecting sheet 200 and the busbar 100 more stable, the mounting slots 140 are straight slots that run through the first surface 121 and the second surface 122. The bent portion 220 can pass through the whole mounting slots 140, so that the contact area between the bent portion 220 and the busbar 110 is increased and the mounting slots' 140 capability of limiting the bent portion 220 can also be improved.

After the bent portion 220 of the connecting sheet 200 is stretched into the mounting slots 140, the connecting sheet 200 and the busbar 100 may be welded together by existing welding methods such as laser welding or ultrasonic welding. Therefore, in the present invention, by merely changing the structures of the busbar 100 and the connecting sheet 200 rather than changing the existing welding process of the connecting sheet 200 and the busbar 100, the connection strength of the busbar 100 and the connecting sheet 200 can be improved. Accordingly, it is convenient to process the sampling component by an existing technology, and the production cost is reduced.

In some optional embodiments, the sampling component 10 further includes a harness isolation plate 300 disposed on a side of the busbar 100 away from the planar portion 210. An evasion hole 310 is formed on the harness isolation plate 300. The evasion hole 310 corresponds to the planar portion 210 in a thickness direction of the busnar 100.

In these optional implementations, after the busbar 100 and the connecting sheet 200 are spliced together and then mounted on the harness isolation plate 300, the busbar 100 and the connecting plate 200 are welded together. In this case, in order to facilitate welding, an evasion hole 310 is formed on the harness isolation plate 300, so that it is convenient to weld the assembled busbar 100 and connecting sheet 200 at the evasion hole 310. The thickness direction of the busbar 100 is a Z direction in FIG. 1, i.e., a direction from the first surface 121 to the second surface 122 of the busbar 100 or a direction from the second surface 122 to the first surface 121.

There are many ways to arrange the bent portion 220 of the connecting sheet 200 in the mounting slots 140. For example, the connecting sheet 200 is a smooth sheet. One end of the connecting sheet 200 is stretched into the mounting slots 140 and then bent to form the first flat portion 210 and the bent portion 220. However, by this process method, it cannot be ensured that the shape of the connecting sheet 200 satisfies the application requirements. It is possible that the included angle between the bent portion 220 and the first flat portion 210 is too large such that the first flat portion 210 cannot be fitted with the first surface 121 of the busbar 100. In some optional embodiments, a notch 130 running through the first surface 121 and the second surface 122 is formed on a side edge 110 of the busbar 100.

In these optional embodiments, by providing the notch 130, an evasion space is reserved for the mounting and assembly of the bent portion 220, and it is convenient to mount the bent portion 220 in the mounting slots 140. Therefore, the connecting sheet 200 may be directly machined in a preset shape. After the connecting sheet 200 is machined in the preset shape, the bent portion 220 is stretched into the mounting slots 140 from the notch 130, without making the connecting sheet 200 extent into the mounting slots 140 and then bending the connecting sheet 200. Consequently, it is convenient to machine the connecting sheet 200, and it can be ensured that the included angle between the bent portion 220 and the first flat portion 210 satisfies the requirements, so that the contact area between the connecting sheet 200 and the busbar 100 is ensured.

In any one of the above embodiments, the direction of extension of the side edge 110 and the mounting slots is not limited, as long as the first flat portion 210 can extend out the side edge 110 from the mounting slots 140 along the surface 120 of the busbar 100 when the bent portion 220 is located in the mounting slots 140.

In some optional embodiments, in order to improve the limiting effect of the mounting slots 140 and simplify the structure, both the side edge 110 and the mounting slots 140 extend in the same direction. Both the side edge 110 and the mounting slots 140 extend in the X direction; the first flat portion 210 extends out from the side edge 110 to be connected to the circuit board 400; the connecting sheet 200 and the circuit board 400 are connected in the Y direction; the direction of extension of the mounting slots 140 is perpendicular to the Y direction; and the limiting resistance applied to the connecting sheet 200 by the mounting slots 140 is opposite to the Y direction, so that the mounting slots 140 can realize a better limiting effect. Meanwhile, by extending the side edge 110 and the mounting slots 140 in the same direction, the structure of the busbar 100 can more satisfy the existing machining standards so that it is convenient for machining and molding; and, the shape of the connecting sheet 200 cooperatively used with the busbar 100 more satisfies the existing machining standards so that it is convenient for machining and molding. Moreover, the material can be saved, and the length of the first flat portion 210 can be decreased.

In any one of the above embodiments, the shape of the notch 130 is not limited as long as the bent portion 220 of the connecting sheet 200 can enter the mounting slots 140 from the notch 130.

In some optional embodiments, in order to facilitate the machining and molding of the notch 130, the notch 130 is regularly rectangular. The shape of the connecting sheet 200 will not be limited, as long as the bent portion 220 of the connecting sheet 200 can be stretched into the mounting slots 140 and the first flat portion 210 of the planar portion 210 can extend from the mounting slots 140 along the surface 120 of the busbar 100 and then extend out the side edge 110. In this case, in order to make the shape of the connecting sheet 200 more regular and easier to process, the connecting sheet 200 is arranged in parallel along two opposite edges, and the width of the connecting sheet 200 in the X direction is slightly less than the width of the notch 130 in the X direction.

Meanwhile, the set position of the mounting slots 140 will not be limited here, as long as the bent portion 220 is located in the mounting slots 140 and the first flat portion 210 can extend out the side edge 110 from the mounting slots 140. For example, the notch 130 includes two opposite side faces and a bottom surface, and the mounting slots 140 are formed on at least one of the two side faces. After the connecting sheet 200 moves into the notch 130 in the second direction (the Y direction in FIG. 1), the bent portion 220 can enter the mounting slots 140 by continuously moving in the X direction, so that it is convenient for mounting the connecting sheet 200 and the busbar 100.

In some optional embodiments, the connecting sheet 200 further includes second flat portions 211. The second flat portions 211 are connected to the first flat portion 210 through the bent portion 220, and the second flat portions 211 are fitted with the first surface 121 and/or the second surface 122.

In these optional embodiments, by providing the second flat portions 211, the contact area between the connecting sheet 200 and the busbar 100 can be further increased, and the connection strength of the connecting sheet 200 and the busbar 100 can also be enhanced.

The specific arrangement way of the second flat portions 211 will not be limited here. The second flat portions 211 may be formed by extending in a direction close to or away from the first flat portion 210.

It should be understood that the number of mounting slots will not be limited here. For example, there is one or more than two mounting slots 140. When there are more than two mounting slots 140, the more than two mounting slots 140 are arranged side by side at intervals in the Y direction.

When there are more than two mounting slots 140, the bent portion 220 includes more than two bent sub-portions 221. The number of bent sub-portions 221 may be equal to or different from the number of mounting slots 140. Here, in order to simplify the device structure and improve the connection strength of the device, the number of sub-portions 221 is equal to the number of mounting slots 140; and, the more than two bent sub-portions 221 are located in the more than two mounting slots 140, respectively, and the first flat portion 210 and the second flat portions 211 are connected to each other by the bent sub-portions 221.

The number of the second flat portions 211 will not be limited here. In order to increase the contact area and connection strength between the busbar 100 and the connecting sheet 200, there are more than two second flat portions 211 when there are more than two bent sub-portions 221.

The width of the mounting slots 140 will not be limited here and may be set according to the actual needs, as long as the bent portion 220 of the connecting sheet 200 can be stretched into the mounting slots 140.

In some optional embodiments, the difference between the thickness of the bent portion 220 in the Y direction and the width of the mounting slots 140 in the Y direction is greater than or equal to 0 and less than or equal to a preset difference, so that the thickness of the bent portion 220 in the Y direction is slightly greater than the width of the mounting slots 140. Accordingly, the interference fit can be realized between the mounting slots 140 and the bent portion 220, the limiting effect of the mounting slots 140 can be further improved, and the connection strength of the connecting sheet 200 and the busbar 100 can be further enhanced. The specific setting way of the preset difference will not be limited here and may be set by a user according to the actual needs. For example, the preset difference may be 0.01 mm, 0.1 mm or even more.

Figure 3:
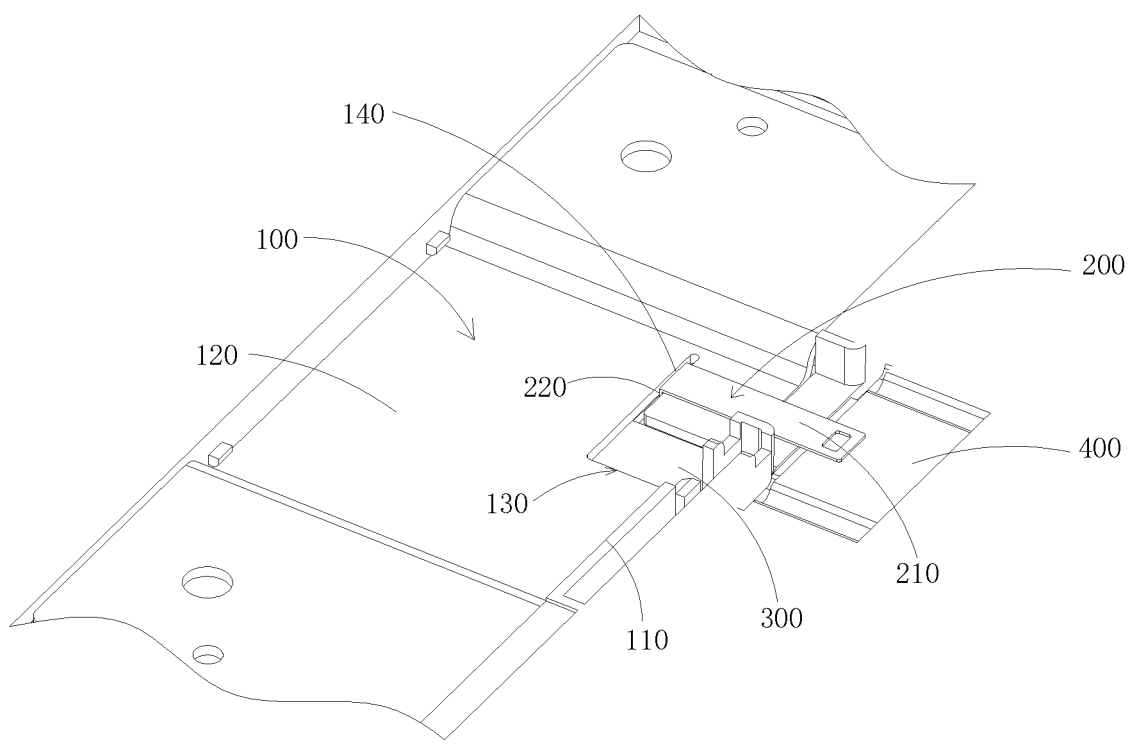
FIG. 3 is a schematic structure diagram of a part of a sampling component at part A in FIG. 2.
Figure 4:
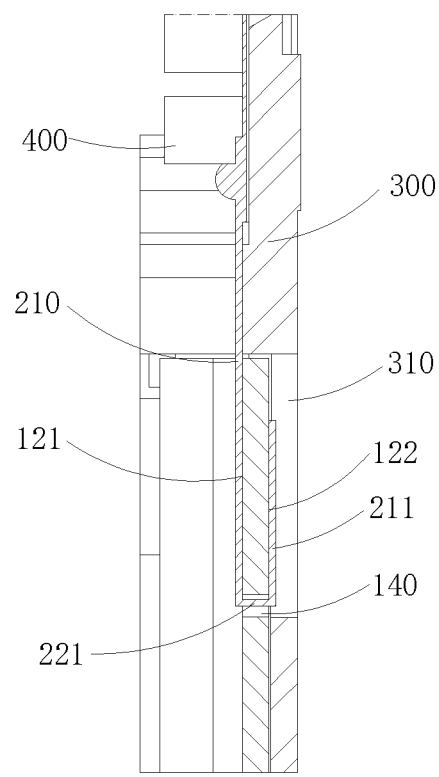
FIG. 4 is a partially sectional view of FIG. 3.
Figure 5:
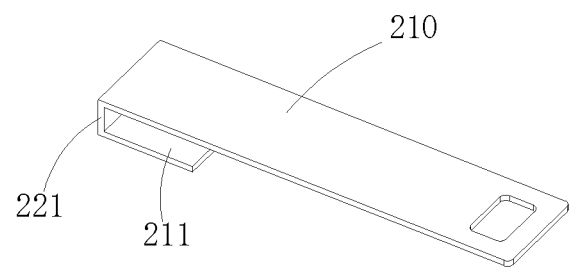
FIG. 5 is a schematic structure diagram of a connecting sheet according to an embodiment of the present invention.

Referring to FIGS. 3-5, in some optional implementations, the connecting sheet 200 includes a first flat portion 210, a bent portion 220 and a second flat portion 211. There are one bent portion 220 and one second flat portion 211. The second flat portion 211 may be formed by extending in a direction close to or away from the first flat portion. Here, in order to improve the limiting effect of the busbar 100 on the connecting sheet 200, the second flat portion 211 is formed by extending in a direction close to the first flat portion 210 so that the cross-section of the whole connecting sheet 200 is U-shaped; and, a part of the busbar 100 is joined in the U-shaped connecting sheet 200 by the mounting slots 140, so that the limiting effect of the busbar 100 on the connecting sheet 200 is improved and the connection strength of the busbar 100 and the connecting sheet 200 is effectively enhanced.

Figure 6:
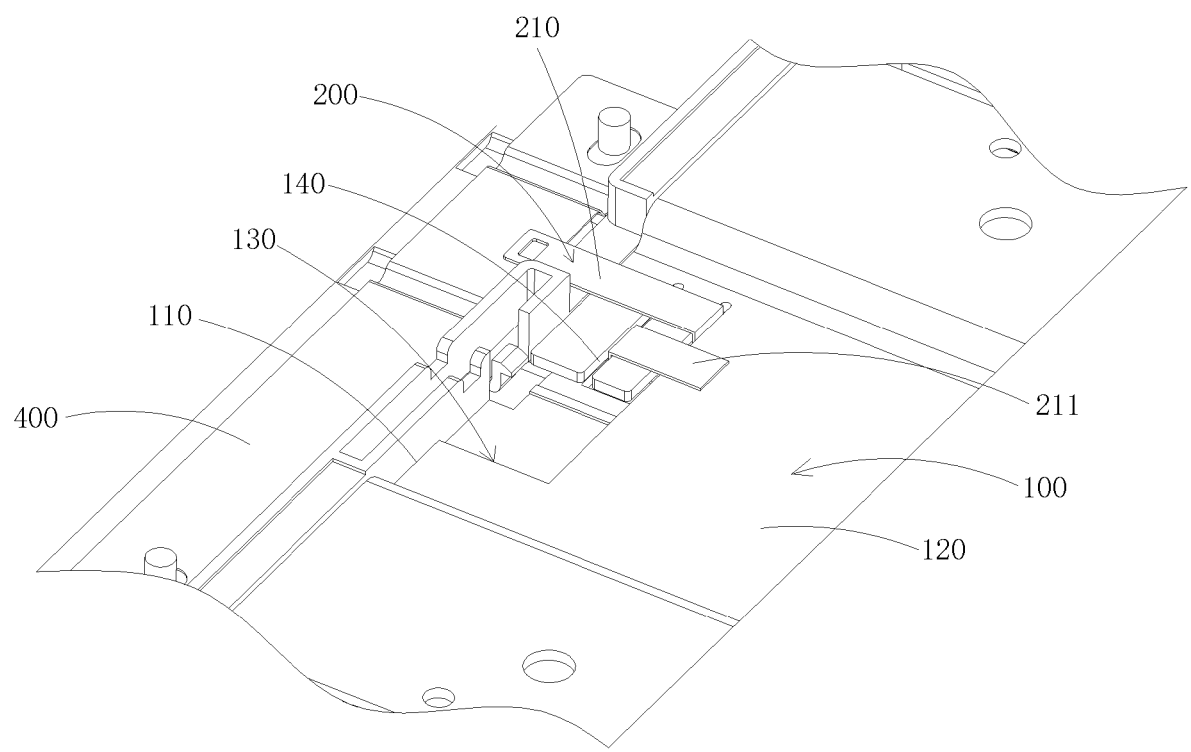
FIG. 6 is a schematic structure diagram of a part of the sampling component at part B in FIG. 2.
Figure 7:
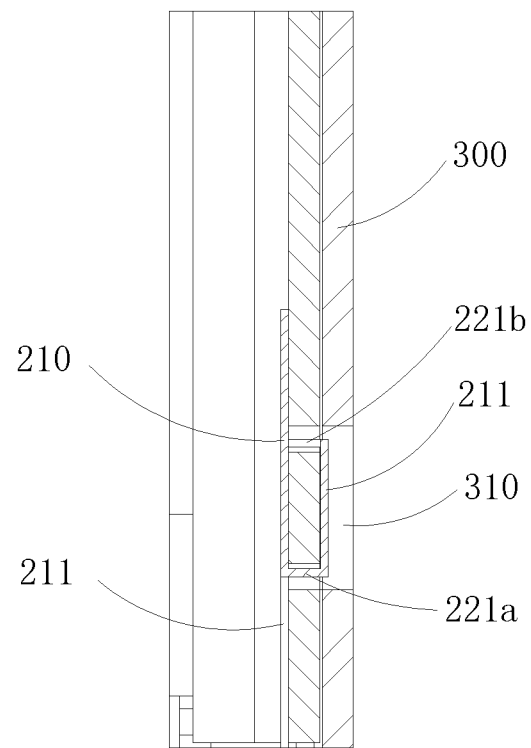
FIG. 7 is a partially sectional view of FIG. 6.
Figure 8:
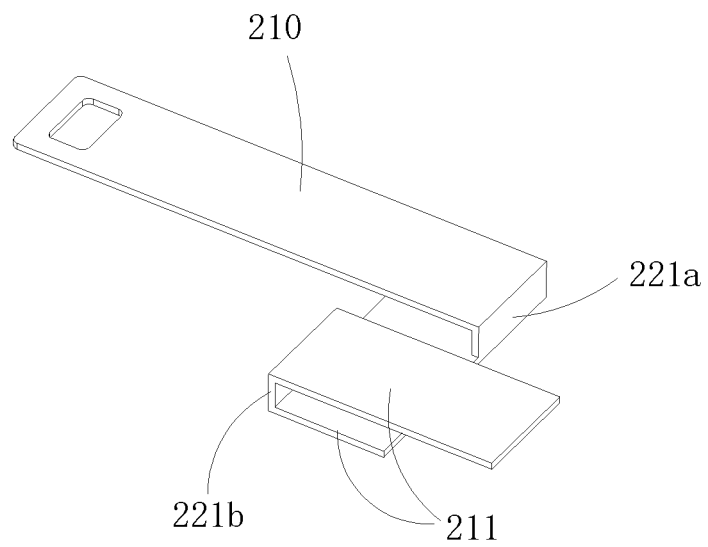
FIG. 8 is a schematic structure diagram of a connecting sheet according to another embodiment of the present invention.

Referring to FIGS. 6-8, in other some optional embodiments, the connecting sheet 200 includes two second flat portions 211, and the bent sub-portions 221 include a first bent sub-portion 221a and a second bent sub-portion 221b, wherein the first flat portion 210 is connected to one of the second flat portions 221 through the first bent sub-portion 221a, and the two second flat portions 221 are connected through the second bent sub-portion 221b.

In these optional embodiments, since there are two second flat portions 211, the connecting sheet 200 can further increase the contact area with the busbar 100 by the two second flat portions 211 and thus increase the welding area and the overload. Meanwhile, by using the first bent sub-portion 221a and the second bent sub-portion 221b, the connecting sheet 200 can be limited by the busbar 100 in the Y direction; and by using the two second flat portions 211, the connecting sheet 200 can be limited by the busbar in the Z direction, so that the stability of the relative position between the connecting sheet 200 and the busbar 100 can be further improved.

The arrangement way of the second flat portions 211 will not be limited here as long as the second flat portions 211 can come into contact with at least one surface 120 of the busbar 100. For example, the second flat portions 211 may be formed by extending the bent sub-portions in a direction close to the first flat portion 210, or the second flat portions 211 are formed by extending the bent sub-portions 221 in a direction away from the first flat portion 210.

In some optional embodiments, one of the second flat portions 211 is formed by extending the first bent sub-portion 221a in a direction close to the first flat portion 210, while the other one of the second flat portions 211 is formed by extending the second bent sub-portion 221b in a direction away from the first flat portion 210. Thus, a closed limiting ring is formed by cross-sections of the two second flat portions 211, the first flat portion 210, the first bent sub-portion 221a and the second bent sub-portion 221b. A part of the busbar 100 is located in the limiting ring by the mounting slots 140, so that it is convenient for limiting the connecting sheet 200 by the busbar 100 in different directions, and the stability of the relative position between the busbar 100 and the connecting sheet 200 is further improved.

Figure 9:
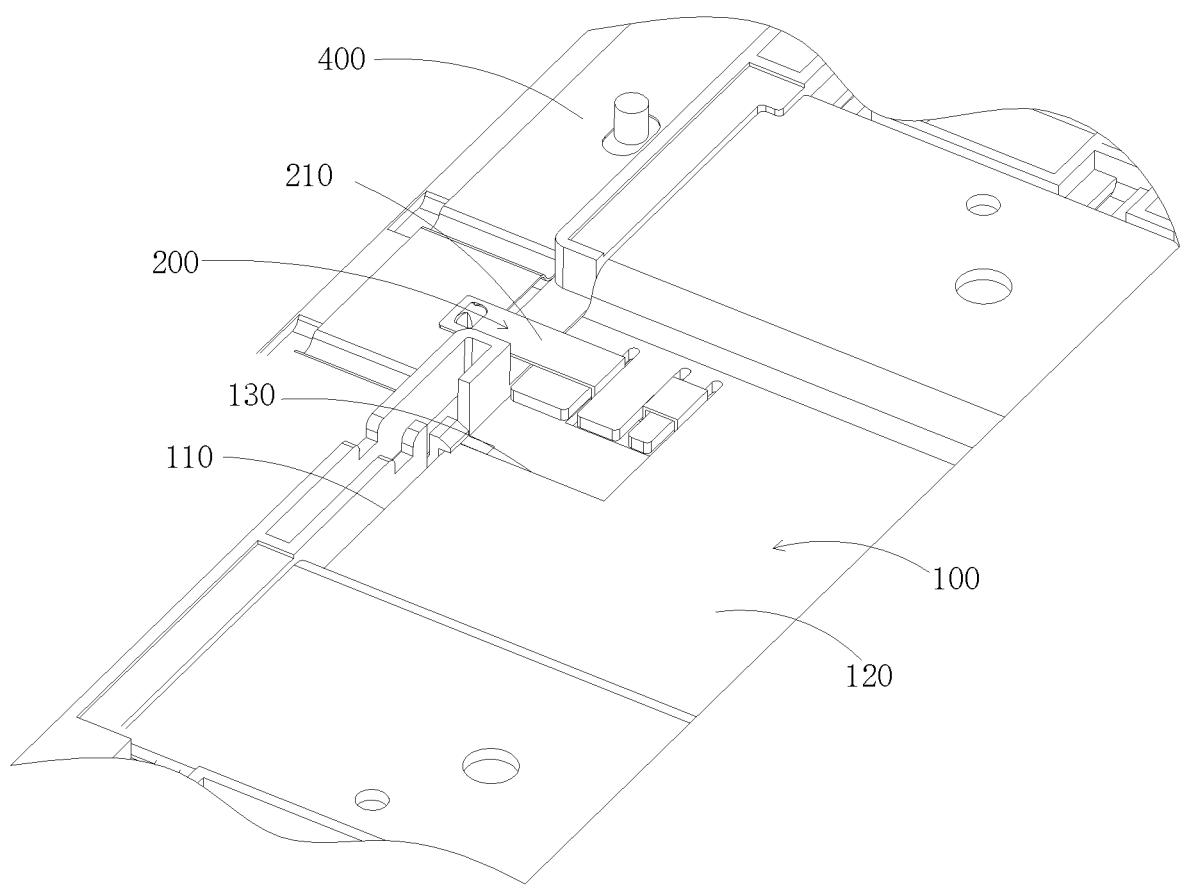
FIG. 9 is a schematic structure diagram of a part of the sampling component at part C in FIG. 2.
Figure 10:
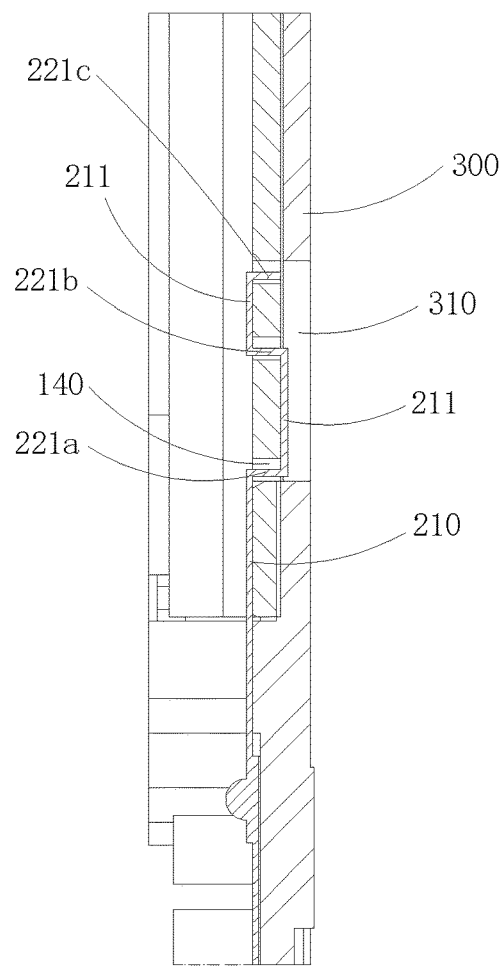
FIG. 10 is a partially sectional view of FIG. 9.
Figure 11:
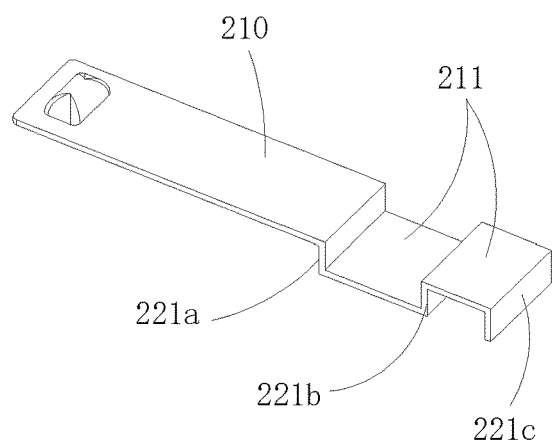
FIG. 11 is a schematic structure diagram of a connecting sheet according to still another embodiment of the present invention.

Referring to FIGS. 9-11, in other some optional embodiments, one of the second flat portions 211 is formed by extending the first bent sub-portion 221a in a direction away from the first flat portion 210, while the other one of the second flat portions 211 is formed by extending the second bent sub-portion 221b in the direction away from the first flat portion 210.

In these optional embodiments, the two flat portions 211 are formed by extending in a direction away from the first flat portion 210. In this way, the interference between the first flat portion 210 and the second flat portions 211 on the same surface 120 of the busbar 100 can be avoided, and it is convenient to additionally provide a bent sub-portion 211 and a second flat portion 211 at free ends of the second flat portions 211 according to the application requirements. As a result, it is convenient to increase the contact area between the connecting sheet 200 and the busbar 100 according to the actual application requirements.

In some optional embodiments, the bent sub-portions 221 further include a third bent sub-portion 221c which is connected to one end, away from the first flat portion 210, the other one of the second flat portions 221. By providing the third bent sub-portion, the stability of the connection between the connecting sheet 200 and the busbar 100 can be further improved.

Further, it is also possible to additionally provide a second flat portion 211 and a bent sub-portion 221 at a free end of the third bent sub-portion 221c. This will not be limited here.

The present invention may be implemented in other specific forms without departing from the spirit and essence of the present invention. For example, the algorithms described in particular embodiments may be modified, but the system architecture does not depart from the basic spirit of the present invention. Therefore, all aspects of the current embodiments shall be regarded as being exemplary rather than limiting, the scope of the present invention is defined by the appended claims rather than the above description, and all variations falling into the scope defined by the meanings and equivalents of the claims shall be included in the scope of the present invention.

What is claimed is:

1. A sampling component applied to a battery module, comprising: a busbar having a first surface and a second surface which are opposite to each other, the busbar comprising mounting slots formed by extending in a direction from the first surface to the second surface, the mounting slots extending in a first direction; a circuit board disposed on a side of the busbar away from the mounting slots; and a connecting sheet, comprising a first flat portion extending in a second direction perpendicular to the first direction and a bent portion which are connected to each other, one end of the first flat portion in the second direction being connected to the busbar via the bent portion while the other end thereof in the second direction being connected to the circuit board, the bent portion being located in the mounting slots.

2. The sampling component according to claim 1, wherein the mounting slots are straight slots that run through the first surface and the second surface.

3. The sampling component according to claim 1, wherein a notch running through the first surface and the second surface is formed on a side edge of the busbar, and the bent portion is capable of being inserted into the mounting slots through the notch.

4. The sampling component according to claim 1, wherein the connecting sheet further comprises second flat portions, which are connected to the first flat portion through the bent portion and fitted with the first surface and/or the second surface.

5. The sampling component according to claim 4, wherein: there are more than two mounting slots, the mounting slots have a preset length in the first direction, and the more than two mounting slots are arranged at intervals in the second direction; and the bent portion comprises more than two bent sub-portions which are located in the more than two mounting slots, respectively, and the first flat portion and the second flat portions are connected to each other by the bent sub-portions.

6. The sampling component according to claim 5, wherein the second flat portions are formed by extending in a direction close to or away from the first flat portion.

7. The sampling component according to claim 6, wherein: there are two second flat portions; the bent sub-portions comprise a first bent sub-portion and a second sub-portion, the first flat portion is connected to one of the second flat portions through the first bent sub-portion, and the two second flat portions are connected through the second bent sub-portion.

8. The sampling component according to claim 7, wherein: one of the second flat portions is formed by extending the first bent sub-portion in a direction close to the first flat portion, while the other one of the second flat portions is formed by extending the second bent sub-portion in a direction away from the first flat portion; or, one of the second flat portions is formed by extending the first bent sub-portion in a direction away from the first flat portion, while the other one of the second flat portions is formed by extending the second bent sub-portion in a direction away from the first flat portion.

9. The sampling component according to claim 8, wherein the bent sub-portions further comprise a third bent sub-portion which is connected to one end, away from the first flat portion, of the other one of the second flat portions.

10. The sampling component according to claim 1, further comprising a harness isolation plate disposed on a side of the busbar away from the first flat portion, an evasion hole arranged opposite to the first flat portion in a third direction being formed on the harness isolation plate.

11. A battery module, comprising: a plurality of batteries arranged side by side in a first direction; and a sampling component connected to the plurality of batteries, the sampling component being the sampling component according to claim 1.

* * * * *